United States Patent

Ott et al.

[11] Patent Number: 5,139,777
[45] Date of Patent: Aug. 18, 1992

[54] COMPOSITION AND METHOD FOR IMPROVING THE EFFICIENCY OF RUMINANT FEED UTILIZATION

[75] Inventors: István Ott Sándor Szentmihályi; János Seregi; Tibor Láng; János Dohy; Imre Moravcsik, all of Budapest; György B. Kiss, Szeged, all of Hungary

[73] Assignee: Richter Cedeon Vegyeszeti, Budapest, Hungary

[21] Appl. No.: 351,295

[22] Filed: May 10, 1989

Related U.S. Application Data

[63] Continuation-in-part of Ser. No. 764,329, Aug. 12, 1985, abandoned.

[30] Foreign Application Priority Data

Aug. 15, 1984 [HU] Hungary ............................ 3084/84

[51] Int. Cl.$^5$ ............... A61K 35/74; C12N 15/01; C12Q 1/10; C12R 1/01
[52] U.S. Cl. ........................... 424/93 A; 435/172.3; 435/38; 435/252.1; 426/61; 424/93 C; 424/93 D
[58] Field of Search ........... 424/92, 93, 9; 426/2, 426/61, 71; 435/172.3, 253, 29, 30, 34, 38, 6, 42; 935/63, 72, 73, 74, 75

[56] References Cited

U.S. PATENT DOCUMENTS

| | | | |
|---|---|---|---|
| 3,857,971 | 12/1974 | Abdo et al. | 426/2 |
| 3,932,670 | 1/1976 | Sakurai | 426/2 |
| 3,956,482 | 5/1976 | Hahn et al. | 435/93 |
| 4,503,155 | 3/1985 | Miller et al. | 435/172.3 |

Primary Examiner—Carolyn Elmore
Assistant Examiner—Marian C. Knode
Attorney, Agent, or Firm—Keil & Weinkauf

[57] ABSTRACT

The invention relates to a composition for improving the efficiency of ruminant feed utilization, which comprises as active ingredient one or more microbial cultures, capable of adjusting the weight ratio of acetic acid to propionic acid to an optimum value, preferably to 1.5–4.0:1, and of growing in the rumen and persisting there at least for 60 days, optionally in admixture with carriers, diluent, preserving agents conventionally used in animal husbandry and nutritive and/or other substances conventionally administered to ruminants.

According to another aspect of the invention there is provided a process for the preparation of microbial cultures used as active ingredient in the above composition.

The invention further relates to a process for the preparation and use of said compositions.

9 Claims, No Drawings

COMPOSITION AND METHOD FOR IMPROVING THE EFFICIENCY OF RUMINANT FEED UTILIZATION

This application is a continuation-in-part of application Ser. No. 764,329, filed on Aug. 12, 1985, now abandoned.

The invention relates to a composition for improving the efficiency of ruminant feed utilization. More particularly, the invention concerns a composition which comprises as active ingredient one or more microbial cultures, capable of adjusting the weight ratio of acetic acid to propionic acid to an optimum value, preferably to 1.5–4.0:1, and of growing in the rumen and persisting there at least 60 days, optionally in admixture with carriers, diluents, preserving agents conventionally used in animal husbandry and nutrition and/or other substances conventionally administered to ruminants. The invention further relates to the preparation of microbial cultures used as active ingredient in the above compositions and to the application of said compositions.

Ruminants possessing composite stomach, as sheep (*Ovis ariea ariea*), cattle (*Bos primigenius taurus*), goat (*Capra hircus*), and their wild relatives (deer and muflon, etc.) have an important role in the nutrient chain and in the economy. Their special importance is that they live on feedstuffs which cannot be utilized by other herbivores. The forestomachs provide anaerobic environment for the rumen flora, which is able to digest cellulose and utilizes non-protein nitrogen beside the common nutrients. The composition of rumen flora largely depends on the fed ration and adapts to the diet. This adaption, however, takes several days and the final stabilization may require several weeks. Abrupt change of the ration adversely affects intake, digestibility and production, and it may cause illness or even death.

It is well known that in 1 ml of rumen liquor millions of bacteria live and grow. Anaerobic fermentation by bacteria is of high importance for the normal digestion and feed intake. Energy producing nutrients are fermented to acetic, propionic and butyric acids, which are used by the host animal as fatty acids; the bacterial mass passing to the intestines will be digested and used as protein source. With respect to the milk and meat production the supply of acetic acid and propionic acid and their mutual proportion play an essential role. Therefore, the rumen flora has an important role in the maintenance and production of the ruminant farm animals.

After birth the rumen flora develops spontaneously and attains its adult composition after weaning to solid food. It is not sure, however, that this accidental flora would represent the optimum fermentative system. It would be advantageous to have a process for the modulation of the composition and/or of the number of the rumen flora according to economic interests.

The increase of volatile fatty acid production in the rumen and thereby the improvement of feed utilization and, accordingly, meat or milk production is a long felt want in the animal husbandry. Certain results have been obtained with monensin [2-[5-ethyltetrahydro-5-{tetrahydro-3-methyl-5-[tetrahydro-6-hydroxy-6-(hydroxymethyl)-3,5-dimethyl-2H-pyran-2-yl]-2-furyl}-2-furyl]-9-hydroxy-$\beta$-methoxy-$\alpha,\gamma$,2,8-tetramethyl-1,6-dioxaspiro[4.5]decane-7-butyric acid] originally used as coccidiostat (see e.g. the U.S. Pat. No. 4,085,255). Experimental use of other related polyethers, such as salinomycin, lasalocid, etc., phthalide derivatives (U.S. Pat. No. 4,333,923) and glycopeptides, such as avoparcin, actaplanin and the like (Ingle et al., *Abstr. Am. Soc. Anim. Sci.* 424/1978/) has also been reported. The effect observed is, however, strongly different on animals fed on various feedstuffs and is not substantial altogether (Chalupa, W., *Chemical Control of Rumen Microbial Metabolism, Digestive Physiology and Metabolism in Ruminants*, MTP Press, Lancaster, England, 1980 and Chalupa, W. et al., *Manipulating Rumen Fermentation with Monensin and Amicloral, Abstr. Am. Soc. Anim. Sci.,* 410/1978/). There is no method known in the art by which directly the microbial culture present in the rumen of ruminants could be influenced to provide significant results.

During our experiments we have found that genetic recombination methods can be successfully used for the separation of microorganisms. Practically any bacterial strain can be labelled by genetic markers, e.g. by an antibiotic resistance factor that allows identification of the bacterium among other bacteria.

We isolated rumen bacteria, genetically labelled the strains and after culturing we reintroduced them into the rumen. Then we took samples of rumen content periodically, cultured them in selective media, and found that some of the strains, that had fermentative characteristics advantageous for the host animal and that were able to grow in vitro, could grow in the rumen and persist there for a long time, if the same feed-stuff was fed as during isolation, and they stimulated digestion and thereby feed utilization by the host animal.

The instant invention relates to a composition which comprises as active ingredient one or more microbial cultures, capable of adjusting the weight ratio of acetic acid to propionic acid to an optimum value of 1.5–4.0:1, and of growing in the rumen and persisting there at least 60 days, optionally in admixture with carriers, diluents, preserving agents conventionally used in animal husbandry and nutrition and/or other substances conventionally administered to ruminants.

If compositions are to be used to increase meat production, the active ingredient preferably is a microbial culture capable of adjusting the ratio of acetic acid to propionic acid to 2.0–3.5:1, e.g. 2:1. For milk production the optimum acetic acid to propionic acid ratio is about 3.0:1, for subsistence or gestation about 4.0:1, and for heifer breeding about 2.0–3.0:1. It is, therefore, advisable to use compositions capable of adjusting the acetic acid to propionic acid ratio to the optimum value for these purposes. In the literature there is some uncertainty as to the most desired acetic acid to propionic acid ratios, the preferred ratio being a function of the ruminant, the feedstuff employed and other factors and its selection is the task of those skilled in the art (see e.g. Kaufmann, W. and Rohr, K., *Der Einfluss des Futters auf die bakterielle Fermentation in Vormagen, Handbuch der Tiernahrung,* 263, 1969, Parey, Hamburg, Berlin).

The invention further relates to a process for the preparation of microbial cultures used as active ingredient in the above compositions, in which samples are taken from the rumen of animals fed on a given feedstuff or ration, metabolism of microbes isolated from the sample is examined in vitro, and microbes with advantageous metabolic characteristics are cultivated in media containing the same feedstuff or ration as carbon- or nitrogen-source, a genetic marker, which makes selection possible, is introduced into the growing microbes, the genetically labelled strains are cultivated, the cultures are reintroduced into the rumen of the animals fed on the same feedstuff or ration, samples are taken from the rumen, the cell number of the genetically labelled strain is counted, strains persisting for at least 60 days and adjusting the acetic acid to propionic acid ratio to an optimum value, preferably to 1.5–4.0:1, are separated, and if desired, these strains are formulated i a form acceptable for the practice of animal husbandry and nutrition.

According to a preferred embodiment of the process of the invention samples are taken from the rumen of a fistulated ruminant fed on hay, cereal meal or molasses, and the cultures containing rumen bacteria are spread on solid media containing N- and C-sources, inorganic salts, rumen liquor and agar (Bryant and Burkey, *J. Dairy Sci.*, 36, 206, 1953). The cultures are incubated in anaerobic conditions, then the clones are isolated and cultured in similar media as above.

The cultures grown out are inoculated into liquid media containing nitrogen-source, inorganic salts, rumen liquor, and as a carbon-source, hay or cellulose, or in other cases cereal meal or molasses, and they are incubated until intensive growth begins in the media.

Cells grown on hay (cellulose), cereal meal (starch) or molasses (sucrose) as carbon sources are spread, cultured and isolated on solid media containing cellulose (for cells grown with hay), glucose (for cells grown with cereal meal) or sucrose (for cells grown with molasses) as carbon source.

The cultures obtained are labeled genetically. For labeling any inheritable genetic marker can be used that allows the identification of the labeled microbe among other microbes.

According to a further preferred embodiment of the invention, antibiotic resistance genes are introduced into the selected cells. If the bacteria living in the rumen are sensitive to a certain antibiotic and resistance cells are mixed to them, growth and death of the latter microbes may be followed easily if the samples are spread on media containing the same antibiotic. In this case only the resistant cells will grow.

By transformation (Bergmans et al., *J. Bacteriol.* 146, 564/1981/) we introduce p1011 plasmid (Simond et al., *Proc. 8th North American Rhizobium Conference*, Winnipeg, Canada, Univ. of Manitoba Press, 1983) carrying kanamycin and chloramphenicol resistance genes into the selected cultures which grow on cellulose, cereal meal or molasses. Plasmid DNA was isolated from *E. coli* cells (Birnboim and Doly, *Nucl. Acid. Res.* 7, 1513/1979/). The strain is deposited in the National Collection of Agricultural and Industrial Microorganisms, Budapest, Hungary, under Accession No. NCAIM B(P) 00264.

After transformation with DNA carrying antibiotic resistance genes, cells containing and expressing the new genetic information are selected on solid media with the above-mentioned composition, but supplemented with kanamycin. The resistant strains will be stored.

With the isolated and stored cultures media containing nitrogen-source, inorganic salts, rumen liquor and agar (to achieve semi-solid consistency) are inoculated and incubated under anaerobic conditions. The developed cultures are mixed to the feed of sheep starved for one day. Before and after feeding bacteria to the animal, rumen samples are taken daily, the samples are spread on the above-described solid media containing kanamycin, and bacterial cells resistant and sensitive to the antibiotic are counted. Ruminal production of volatile fatty acids is also determined qualitatively and quantitatively. It is known that feed utilization by ruminants is affected by the ratio of volatile fatty acids (Eskeland et al., *J. Anim. Sci.* 33, 282/1971/; Church et al., *Digestive Physiology and Nutrition of Ruminants*, Vol. 2, pp. 622–625, 1971/. As mentioned above, the optimum ratio of acetic acid to propionic acid is considered to be 2.0–3.5:1, 3:1, and 4:1, respectively, for growing, milk production, and maintenance as well as pregnancy, resp. (Kaufmann, W. and Rohr, K.: *Der Einfluss des Futters auf die bakterielle Fermentation in Vormagen*. In: Hanbuch det Tierernährung, p. 263, Parey, Hamburg-Berlin, 1969).

According to a preferred embodiment of the process of the invention bacteria are isolated from rumen samples and the capacity of the isolates to produce volatile fatty acids is examined. The microorganism is cultured in anaerobic conditions in the described complete media containing rumen liquor, then acetic, propionic and butyric acid concentrations of the cultures are determined. Microbial cells producing volatile fatty acids in required ratios are labelled genetically and their ruminal growth are examined.

Strains, that are able to grow in the rumen of the animal fed on the described feedstuff at least for 60 days and that can ferment dietary carbohydrates to volatile fatty acids in optimum ratios, are selected, grown, isolated, maintained and stored, and, if desired, their cultures, in a form acceptable for animal husbandry, will be orally administered to ruminants, for developing or modulating the rumen flora.

Three strains, Hh-GYOKI-1-123Sz, Hh-GYOKI-2-14Ab and Hh-GYOKI-3-81Me, capable of growing in the rumen of animals fed on hay, cereal meal or molasses, respectively, that could persist in the rumen for a long and affected digestion advantageously, have been deposited in the National Collection of Agricultural and Industrial Microorganisms, Budapest, Hungary, under Accession Nos. NCAIM B(P) 000287, NCAIM B(P) 000288 and NCAIM B(P) 00298 respectively.

The microorganism Hh-GYOKI-1-123 Sz, which was isolated from rumen, biosynthesizes propionic acid. The bacterium is of Gram-positive coloring and rodlet-shaped. It ferments glucose and starch to propionic acid and acetic acid while some butyric acid and carbon dioxide respectively, are being formed. The cells which are rodlet-shaped in their early age on complete culture media will change later to pleomorphous form without cilium, often widening on their tips and having an irregular form and size. It readily grows under anaerobic and semi-anaerobic conditions, too, it is facultatively anaerobic.

On the above basis the strain Hh-GYOKI-1-123 Sz, can be assigned to the Propionibacterium genus of the Propionibacteriaceae family. (The microorganism Hh-GYOKI-48a originating from Hh-GYOKI-1-123 can be similarly assigned to the Propionibacterium genus.)

The microorganism Hh-GYOKI-2-14 Ab isolated from rumen produces propionic and acetic acids, it is unmoving and of spherical form, it is of Gram-negative coloring. It readily grows also under anaerobic conditions at a temperature of 37° C. The cells of spherical form are settled down in great quantities beside each other, their average size is of 0.3-0.4 μ. It ferments acid and carbon dioxide from carbohydrates and produces hydrogen sulfide on complete culture media. It does not liquefy gelatine, and does not haemolyze. On the basis of the above features the microorganisms Hh-GYOKI-2-14 Ab can be assigned to the slightly known Veillonella genus.

The microorganisms Hh-GYOKI-3-81 Me produces acetic acid and is facultatively anaerobic. The cells do not move, are rodlet-shaped, and their ends are flattened. They are of Gram-positive coloring. In addition to acetic acid they produce lactic acid from glucose. On different culture media the rodlets rarely stand singly, more often in a chain. Producing of pigments cannot be observed.

Based on the above facts, the microorganisms Hh-GYOKI-3-81 Me can be assigned within the family Lactobacteriaceae to the genus Bifidobacteria.

The determinations of species have been made according to the following literature; Bergey's Manual of Determinative Bacteriology; Breed, Murray and Hitchens. The Williams and Wilkins Company, Baltimore, 1948, 8th edition.

According to the invention it is preferred to culture the microorganisms of rumen origin between 32° C. and 37° C., under anaerobic conditions, with the exclusion of oxygen, in media containing carbon- and nitrogen-sources, inorganic salts, reducing agents and rumen liquor; the latter provides growth factors. As carbon source glucose, cellulose, hay, cereal meal or molasses can be used, while inorganic salts, yeast extract, casein and similar additives are suitable N-sources.

An essential feature of the invention is that unicellular organisms advantageously fermenting the fed feedstuff or ration and capable of persisting in the rumen for a long period are used for the modulation of ruminal flora. For the selection of such strains genetic markers are used, as described above, e.g., genes coding antibiotic resistance, enzyme proteins or other detectable proteins. Auxotrophic cells can be used, too.

The genetic marker is introduced into the cell by a vector DNA molecule, e.g. by a plasmid or phage, but selectable characteristics, e.g. resistance to an antibiotic, can be chosen by spontaneous selection, too.

The selected strains, which have advantageous fermentative characteristics and persist in the rumen for a long period, are used either to enhance the development of rumen flora in suckling ruminants or to modify advantageously the composition of the established rumen flora. It is recommended to administer the preparation with the feed or drinking water.

The microorganism selected for making the preparation according to the invention is cultured in media containing organic carbon source, organic or inorganic nitrogen source and organic and inorganic salts, and is then isolated in a form suitable for oral administration or for transport. If desired, the microorganism culture is formulated by mixing it with solid or liquid carriers or other additives. The preparation can be mixed to the feed or drinking water, or can be fed alone.

In case of sheep, for example 1 to 20 g, preferably 5 g, of microorganism culture according to the invention are added to about 0.5 kg of feed. As a feedstuff e.g. a mixture of corn-meal, lucerne hay and beef cattle feed can be used, and the actual proportions should be determined in view of the actual conditions and the desired daily gain in weight. Cattle are generally administered 10 to 200 g, preferably 50 g, of a microorganism culture according to the invention per day, e.g. in admixture with about 5 kg of a conventional feedstuff.

The method of improving the efficiency of feed utilization of ruminants is also within the scope of the invention.

After culturing in liquid media, as mentioned hereinbefore, the microorganisms are separated by centrifugation or filtration. Pastes, freeze dried preparations or suspensions containing spores or vegetative forms, etc. may be prepared and additives acceptable for animal husbandry and nutrition may be added. Other additives, e.g. proteins, amino acids or glycerol, may help to keep the microorganisms viable. To the compositions according to the invention used to improve feed utilization in ruminants other substances conventionally used in the practice may also be added, e.g. antibiotics that stimulate the growth of the host animal (monensin, nigericin, salynomycin etc.) or enhance the persistency of the microorganisms fed.

So the microbial cultures according to the invention enable the formation of a living microbial culture in the rumen or the advantageous modification of an established flora.

During the suckling period the rumen flora is unable to effectively ferment the common feedstuffs. The flora develops spontaneously and accidentally, and it is by no means certain that its composition is optimal for the host animal.

By feeding the selected microbial strains, instead the slow and spontaneous development of the rumen flora, a rapid development may be achieved, and the rumen flora will be capable of optimally utilizing the feed.

The advantage of the instant process is that with the microorganisms prepared in the described way (e.g. with the strains NCAIM B(P) 000287, NCAIM B(P) 000288 and NCAIM B(P) 000289) we can promote the rapid adaption or development of rumen flora during feed change or weaning, by enhancing ruminal growth of microorganisms capable of optimal degradation of the feed.

The process can be used, among others, in the following cases:

for dairy cows during changes of lactation, at the end of pregnancy and during seasonal and other changes of the ration;

for beef cattle at the beginning and end of the grazing period, at the change of fattening with roughages to an intensive fattening with cereal meal, and during other changes of the growing-fattening diet;

for sheep during the seasonal changes of feeding, at the beginning and end of the grazing period and during the commencement of an intensive growing and fattening.

The possibilities are similar in the goat husbandry, too. Microbial cultures prepared by the process of the invention may be used also in several special cases, e.g. for wild-living ruminants, in game preserves and for the fallow-deer.

It should be noted that although the microbial cultures used in the compositions according to the invention preferably are of rumen origin, other acetic acid and/or propionic acid producing bacteria, which do not necessarily originate from the rumen, are also suitable. Such bacteria include certain members of the genus *Angerovibrio (lipolytical)*, Bacteroides,

*Selenomonas (ruminanticum)* and Propionibacteria.

The invention will further be illustrated by the aid of the following, non-limiting Examples. The preparation of microbial strains which are capable of utilizing basic rations containing mainly cellulose (hay), starch (cereal meal) or sucrose (molasses) and persist in the rumen for a long period will be described in detail. The use of the preparation is described for sheep, but the scope of protection extends to microorganisms capable of growing on other feedstuffs and to the development or modification of the rumen flora of other ruminant species as well.

EXAMPLE 1

Modification of the rumen flora of animals fed on hay.

A) Isolation of microorganisms able to grow on hay

Sheep are laparatomized fitted with rumen fistula and fed on hay for a month. Rumen sample is taken through the fistula, diluted and spread on RGCA solid media of following composition:

| Salt solution I: | |
|---|---|
| $K_2HPO_4$ | 0.6 g |
| distilled water ad | 100.0 g |
| Salt solution II: | |
| NaCl | 1.2 g |
| $(NH_4)_2SO_4$ | 1.2 g |
| $KH_2PO_4$ | 0.6 g |
| $CaCl_2$ | 0.12 g |
| $MgSO_4.7H_2O$ | 0.25 g |
| distilled water ad | 100.0 ml |
| Resazurin (0.1% solution) | 0.1 ml |
| Agar (Bacto)[x] | 2.5 g |
| Rumen liquor[xx] | 10.0 ml |
| Glucose | 0.05 g |
| Cellobiose | 0.05 g |
| Cystein.HCl monohydrate | 0.05 g |
| Sodium carbonate (8% solution) | 5.0 g |
| Distilled water ad | 50.0 ml |

[x]Difco Labs. Detroit. USA
[xx]The sample of rumen content is filtered through several layers of gauze, then the filtrate is stored under carbon dioxide at $-20°$ C.

Before sterilization under $CO_2$ gas, the pH of the media RGCA is adjusted to 6.8. Sterilization, preparation of the media and cultivation are performed according to Bryant and Burkey (*J. Dairy Sci.*, 36, 205/1953/).

The rumen liquor is diluted with a sterile mixture of the following composition:

| salt solution I (see above) | 7.5 ml |
|---|---|
| salt solution II (see above) | 7.5 ml |
| cystein.HCl monohydrate | 0.05 g |
| $Na_2CO_3$ | 0.3 g |
| resazurin (0.1% solution) | 0.1 ml |
| distilled water ad | 100.0 ml |

The name of this mixture is HB.

The cultures are incubated in anaerobic conditions at 35° C. (see Atlas of Rumen Microbiology, Ogimoto and Imai, Japan Scientific Societies Press, Tokyo, 1981) for 120 hours, then the individual clones are inoculated into media, containing extracted hay, of the following composition:

| salt solution I (see above) | 15.0% |
|---|---|
| salt solution II (see above) | 15.0% |
| resazurin (0.1% solution) | 0.1% |
| Tripton L42 (Oxoid)[x] | 15.% |
| yeast extract (Oxoid)[x] | 0.5% |

| -continued | |
|---|---|
| rumen liquor[xx] | 10.0% |
| $Na_2CO_3$ | 0.4% |
| cystein.HCl monohydrate | 0.05% |
| extracted hay[xxx] | 10.0% |

Name of the media: RGCF liquid media
[x]Oxoid Ltd., London, UK.
[xx]See above
[xxx]For preparing extracted hay finely cut hay particles are suspended in water, boiled and filtered. The filtration rest is added to the media before sterilization.

Before sterilization the pH of the media is adjusted to 6.5.

Test tubes containing 5 ml of sterile media are inoculated with the microbial suspension obtained from individual clones grown on RGCA solid media and incubated under anaerobic conditions at 35° C. The growth is checked by microscopic examination and the cultures are spread on RGCA solid media where 2.0% Bacto cellulose are substituted for the glucose and the cellobiose.

The cultures are incubated in anaerobic conditions at 35° C. for 120 h, then individual clones made up of cells utilizing cellulose are inoculated onto RGCA media containing cellulose.

This way ruminal microorganisms able to grow on hay or cellulose can be obtained.

B) Genetic labelling of rumen bacteria able to grow on hay

Genetic labelling is performed with *E. coli* p1011 plasmid, according to Simon et al. (Proc. 8th North American Thizobium Conference, Winnipeg, Canada, Univ. of Manitoba Press, 1983).

The plasmid DNA is isolated from an *E. coli* culture according to Birnboim and Doly (*Nucl. Acid Res.* 7, 1513/1979/) and is dissolved in an aqueous solution containing the following components:

| 75 mM $CaCl_2$ |
|---|
| 5 mM $MgCl_2$ |
| 10 mM tris.HCl buffer[x], pH 7.5 |

[x]tris-(Hydroxymethyl)-aminomethane hydrochloride

Microbes able to grow on hay and isolated according to item A) of Example 1 are cultured on RGCF media and separated by centrifugation under $CO_2$. The cells are suspended in an aqueous solution containing in 1 liter the following components:

75 mM $CaCl_2$
5 mM $MgCl_2$
10 mM tris.HCl buffer, pH 7.5
1 nM crystein.HCl monohydrate
1 mM sodium thiosulfate wherein the suspensions should contain $5 \times 10^9$ cells per ml. The suspension is diluted with the same volume of solution containing plasmid DNA (0.1 μg/ml) and is incubated for 60 min. at 4° C. Then the incubation is continued at 41° C. for 2 min., then the culture is spread on solid media containing 500 μg/ml of kanamycin B, and cellulose as a carbon source. The culture is incubated at 35° C. for 120 h under anaerobic conditions and clones able to grow in the presence of 500 μg/ml of kanamycin B are examined.

Plasmid p1011 carries genes determining resistance to kanamycin and chloramphenicol; furthermore, it contains replication origin allowing the start of replication in *E. coli* cells. If transformed into other bacteria, owing to its lack of suitable origin allowing replication, the plasmid DNA is either eliminated or incorporated into the chromosome (partly or completely) and genetic recombination takes place. Eventually the gene incorporated into the chromosome is expressed and endows the cells with kanamycin and chloramphenicol resistance.

In our experiments we obtained kanamycin B resistance clones with transformational frequency of $3 \times 10^{-5}$.

Several resistant clones were isolated and we determined the sensitivity to antibiotic of the initial and kanamycin B resistant (Km ®) strains. Results obtained with several strains are shown in Table 1.

TABLE 1

Sensitivity to kanamycin B of rumen bacteria and of strains labelled genetically and degrading hay

| Microbe | Least effective concentration of kanamycin B, µg/ml |
|---|---|
| Rumen liquor | 31 |
| Initial strains | 4.0 to 7.5 |
| Genetically labelled Km ® strains | |
| Hh-GYOKI-1-8 | 500 |
| -27 | 250 |
| -91 | 500 |
| -123 | 1000 |
| -142 | 500 |

So we can obtain microorganisms of rumen origin that are able to utilize hay or cellulose and to grow in the presence of high amounts of kanamycin B.

The strain Hh-GYOKI-1-123 (Km ®) is spread on RGCA media containing cellulose, whereafter kanamycin B in concentrations of 1000, 5000 and 10,000 µg/ml are added. The cultures are incubated in anaerobic conditions at 35° C. for 168 h and the strains growing in presence of 10,000 µg/ml antibiotic are isolated. So, with spontaneous selection, we obtain spontaneous mutants highly resistant to kanamycin B. One of these strains has been designated Hh-GYOKI-1-123Sz and deposited in the Hungarian National Collection of Medical Bacteria of the National Institute of Hygiene, Budapest, under No. 00287.

C) Reintroduction of labelled microbes into the rumen

Sterile, solid media named RGCFa are inoculated with the culture of strain Hh-GYOKI-1-123 (Km ®) stored on RGCA slants at +4° C. The composition of RGCFa media is as follows:

| 1. | $K_2HPO_4$ | 0.3% | 45 ml solution |
|---|---|---|---|
| 2. | $(NH_4)_2SO_4$ | 0.6% | 45 ml solution of the mixture |
|   | NaCl | 0.6% | |
|   | $MgSO_4.2H_2O$ | 0.06% | |
|   | $CaCl_2.2H_2O$ | 0.06% | |
|   | $KH_2PO_4$ | 0.3% | |
| 3. | Cellulose (Bacto)$^x$ | 1.8% | 65 ml solution of the mixture |
|   | Agar (Bacto)$^x$ | 3.0% | |
| 4. | Yeast extract | 0.1% | 20 ml solution |
| 5. | $Cystein.HCl.H_2O$ | 0.1% | 20 ml solution |
| 6. | Sodium thiosulfate | 0.1% | 10 ml solution of the mixture |
|   | $Na_2CO_3$ | 0.2% | |
| 7. | Rumen liquor$^{xx}$ | | 20 ml |

$^x$Difco Labs. Detroit, USA
$^{xx}$See above

The 7 solutions are prepared separately and mixed in the given sequence.

Cultivation is performed in 500 ml Erlenmeyer flasks containing 150 ml of media, under anaerobic conditions. Growth is checked after 48 hours, then the culture is mixed to the feed of a hay-fed sheep. Three hundred forty ml of culture containing $4.7 \times 10^6$ bacteria per ml were orally administered to the sheep. Before administration and on the consecutive days 50 to 200 ml samples are taken through the rumen fistula. The samples are diluted with HB solution and spread on RGCA media lacking kanamycin B or other antibiotics. The cultures are incubated in anaerobic conditions at 35° C. for 72 hours and the bacterial clones are counted. Results are shown in Table 2.

TABLE 2

Changes of rumen flora of a sheep treated with strain Hh-GYOKI-1-123 (Km ®)

| | Cell count/ml | |
|---|---|---|
| Sample | Without antibiotics | In the presence of 1000 µg/ml of kanamycin B |
| Before administration | $5 \times 10^6$ | 0 |
| After administration | | |
| day 1 | $5.9 \times 10^6$ | $2.0 \times 10^4$ |
| day 2 | $3.2 \times 10^7$ | $4.1 \times 10^4$ |
| day 3 | $2.4 \times 10^6$ | $3.1 \times 10^4$ |
| day 6 | $3.9 \times 10^7$ | $1.8 \times 10^4$ |
| day 8 | $9.8 \times 10^6$ | $1.05 \times 10^5$ |
| day 15 | $8.1 \times 10^5$ | $3.1 \times 10^4$ |

It is seen from Table 2 that the microorganism administered to the animal persists and grows in the rumen.

According to the above-mentioned process we also cultivated the strain Hh-GYOKI-1-123Sz resistant to 10,000 µg/ml kanamycin B, and orally administered it to the same sheep on the 15th day.

Hundred forty ml culture containing $2 \times 10^8$ bacterial per ml were administered orally.

Bacteria of rumen samples were cultivated and counted as before. Results are shown in Table 3.

TABLE 3

Changes in the rumen flora of a sheep treated with strain Hh-GYOKI-1-123Sz (Km ®)

| | Cell count/ml | |
|---|---|---|
| Sample | Without antibiotics | In the presence of 8000 µg/ml of kanamycin B |
| Before administration | $1.4 \times 10^6$ | 0 |
| After administration | | |
| day 1 | $7.4 \times 10^6$ | $3.2 \times 10^4$ |
| day 2 | $1.7 \times 10^5$ | $1.3 \times 10^4$ |
| day 5 | $4.0 \times 10^6$ | $9.1 \times 10^3$ |
| day 7 | $1.1 \times 10^7$ | $2.0 \times 10^4$ |
| day 14 | $8.0 \times 10^6$ | $3.1 \times 10^4$ |
| day 21 | $7.1 \times 10^5$ | $6.2 \times 10^4$ |
| day 28 | $8.2 \times 10^6$ | $8.1 \times 10^4$ |
| day 35 | $8.7 \times 10^6$ | $1.8 \times 10^4$ |

The data of Table 3 indicate that the microorganism administered is present in significant quantities in the rumen and, because the fluid phase of the rumen content is continuously emptied, it surely replicates. Differences of bacterium counts between samples may be explained by variations of the consistency of rumen content from thick to fluid.

EXAMPLE 2

Modification of rumen flora in a sheep fed on cereal meal

A) Isolation of microorganisms able to grow on cereal meal

The process described under item A) of Example 1 is repeated with the difference that the initial sample is taken from the rumen of a sheep fed on cereal meal, the individual isolates are inoculated into RGCF liquid media (see above) containing 2% of cereal meal powderized in a mortar, instead of extracted hay, cultures grown in RGCF liquid media are spread on RGCA solid media (see above) and clones developed from cells able to utilize cereal meal are isolated on similar media.

In this way microorganisms able to grow on cereal meal as a carbon source are obtained.

B) Genetic labelling of rumen bacteria utilizing cereal meal

The process described under item B) of Example 1 is repeated with the difference that strains obtained according to item A) of Example 2 are used for transformation by p1011 plasmid DNA, instead of those obtained according to item A) of Example 2.

Resistance to kanamycin B of several transformed and Km ® strains is shown in Table 4.

TABLE 4

Sensitivity to kanamycin B of rumen bacteria and of strains labelled genetically and utilizing cereal meal

| Microorganisms | Lowest kanamycin B concentration inhibiting growth. μg/ml |
|---|---|
| Rumen liquor | 31 |
| Initial strains | 1.8 |
| Genetically labelled Km ® strains | |
| Hh-GYOKI-2-4 | 250 |
| -14Ab | 250 |
| -37 | 250 |
| -81 | 125 |

By performing the above-mentioned process microbes of rumen origin are obtained that are able to utilize cereal meal as carbon source and are eight times more resistant to kanamycin B than the rumen flora.

The strain designated as Hh-GYOKI-2-14Ab has been deposited in the National Collection of Agriculture and Industrial Microorganisms, Budapest, Hungary, under Accession No. NCAIM B(P) 000288.

C) Reintroduction of microorganisms labelled genetically into the rumen

The process described under item C) of Example 1 is repeated with the difference that sterile RGCFa media containing 1.8% of starch, instead of 1.8% of cellulose (Bacto), is inoculated, mixed into the feed of the sheep and samples are taken daily through the fistula before administration and after administration. Three hundred ten ml culture containing $7.1 \times 10^5$ bacteria/ml were administered orally to the sheep.

TABLE 5

Changes in the rumen flora of the a sheep treated with strain Hh-GYOKI-2-14Ab (Km ®)

| | Cell number/ml | |
|---|---|---|
| Sample | Without antibiotics | In the presence of 250 μg/ml of kanamycin B |
| Before | $4.6 \times 10^6$ | $1.4 \times 10^1$ |

TABLE 5-continued

Changes in the rumen flora of the a sheep treated with strain Hh-GYOKI-2-14Ab (Km ®)

| | Cell number/ml | |
|---|---|---|
| Sample | Without antibiotics | In the presence of 250 μg/ml of kanamycin B |
| administration After administration | | |
| day 1 | $4.1 \times 10^6$ | $1.8 \times 10^3$ |
| day 2 | $3.2 \times 10^6$ | $2.1 \times 10^3$ |
| day 3 | $8.0 \times 10^3$ | $1.1 \times 10^3$ |
| day 6 | $9.1 \times 10^6$ | $7.1 \times 10^2$ |
| day 8 | $8.0 \times 10^6$ | $8.1 \times 10^3$ |
| day 15 | $6.8 \times 10^6$ | $8.7 \times 10^3$ |
| day 22 | $5.0 \times 10^6$ | $9.8 \times 10^3$ |
| day 29 | $8.0 \times 10^6$ | $1.1 \times 10^4$ |
| day 36 | $9.1 \times 10^6$ | $7.0 \times 10^3$ |
| day 43 | $7.0 \times 10^6$ | $7.9 \times 10^3$ |
| day 60 | $6.1 \times 10^6$ | $7.0 \times 10^3$ |

The data of Table 5 indicate that the microorganism administered persists and replicates in the rumen for a long time.

EXAMPLE 3

Modification of the rumen flora of a sheep fed on molasses

A) Isolation of microorganisms able to grow on molasses

The process described under item A) of Example 1 is repeated with the difference that the initial samples are taken from a sheep fed on molasses, the individual isolates are inoculated to RGCF media containing glucose instead of extracted hay, the cultures grown in liquid media are spread on RGCA media and clones grown from cells utilizing molasses are inoculated on the same RGCA media.

So microorganisms of rumen origin utilizing molasses are obtained.

B) Genetic labelling of bacteria utilizing molasses

The process described under item B) of Example 1 is repeated with the difference that cells prepared according to item A) of Example 3 are transformed by p1011 plasmid DNA, instead of those obtained according to item A) of Example 1.

The resistance to kanamycin B of several Km ® strains is shown in Table 6.

TABLE 6

Resistance to kanamycin B of rumen bacteria and of genetically labelled strains utilizing molasses

| Microorganisms | Lowest concentration of kanamycin B inhibiting growth |
|---|---|
| Rumen liquor | 31 |
| Initial strains | 7.5 |
| Genetically labelled Km ® strains | |
| Hh-GYOKI-3-2 | 250 |
| -14 | 500 |
| -34 | 250 |
| -81Me | 500 |
| -132 | 500 |

In this way isolates highly resistant to kanamycin B and utilizing molasses are obtained.

The strain signed Hh-GYOKI-3-81Me has been deposited in the Hungarian National Collection of Medical Bacteria of the National Institute of Hygiene, Budapest under No. 00289.

C) Reintroduction of genetically labelled bacteria into the rumen

The process described under item C) of Example 1 is repeated with the difference that the strain Hh-GYOKI-3-81Me is inoculated onto RGCFa media containing 1.8% of glucose instead of 1.8% of cellulose, and the culture is mixed with the feed of a sheep fed on molasses. Three hundred eighty ml of a culture containing $1.6 \times 10^7$ bacterial per ml were orally administered. One sample each will be taken daily before and after administration through a rumen fistula.

TABLE 7

Changes in the rumen flora of a sheep treated with strain Hh-GYOKI-3-81Me (Km ®)

| Sample | Cell number/ml | |
|---|---|---|
| | Without antibiotics | In the presence of 500 μg/ml of kanamycin B |
| Before administration | $5.0 \times 10^6$ | 0 |
| After administration | | |
| day 1 | $1.1 \times 10^6$ | $1.9 \times 10^5$ |
| day 2 | $1.8 \times 10^7$ | $2.5 \times 10^5$ |
| day 3 | $6.2 \times 10^6$ | $6.1 \times 10^5$ |
| day 6 | $8.1 \times 10^6$ | $8.7 \times 10^5$ |
| day 8 | $6.2 \times 10^6$ | $9.1 \times 10^5$ |
| day 15$^x$ | $1.3 \times 10^3$ | $1.3 \times 10^2$ |
| day 22 | $3.0 \times 10^6$ | $3.1 \times 10^5$ |
| day 29 | $1.1 \times 10^6$ | $7.0 \times 10^5$ |
| day 36 | $8.0 \times 10^5$ | $9.1 \times 10^4$ |
| day 43 | $6.1 \times 10^6$ | $8.1 \times 10^5$ |
| day 60 | $6.8 \times 10^6$ | $6.4 \times 10^5$ |

$^x$Sampling error

The data indicate that the microorganism administered persists for a long period in the rumen of sheep fed on molasses.

EXAMPLE 4

Changes in ratios of volatile fatty acids owing to treatment with the bacterial preparation Two sheep are fed on a complete ration for 14 days, then rumen sample is taken through a fistula. Two liters of rumen liquor are filtered through several layers of gauze. The particulate rest is suspended in 1 liter of physiological buffer (see below), mixed and filtered as before. The two filtrates are mixed, left to stand for an hour, solids floating on the surface are discarded and the liquid phase is used for the examination.

The composition of the physiological buffer is as follows:

| | |
|---|---|
| $Na_2HPO_4$ | 0.316 g/l |
| $KH_2PO_4$ | 0.152 g/l |
| $NaHCO_3$ | 2.260 g/l |
| KCl | 0.375 g/l |
| NaCl | 0.375 g/l |
| $MgSO_4$ | 0.112 g/l |
| $CaCl_2.H_2O$ | 0.050 g/l |
| $FeSO_4.7H_2O$ | 0.008 g/l |
| $MnSO_4.H_2O$ | 0.004 g/l |
| $ZnSO_4.7H_2O$ | 0.004 g/l |
| $CuSO_4.5H_2O$ | 0.002 g/l |
| $CoCl_2.6H_2O$ | 0.001 g/l |

The pH of the mixture is checked and, if required, adjusted to pH 7.2 with an aqueous HCl or NaCH solution (Cheng et al.: *J. Dairy Sci.* 38, 1225/1955/).

To the mixture obtained the same volume of physiological buffer is added and in 1 liter of the diluted mixture 4 g of the ration is suspended. Thirty ml each of the suspension is poured into Erlenmeyer flasks of 100 ml volume. 200 doses are sterilized and another 200 are not.

Sterile media and media containing living rumen bacteria are inoculated with bacterial strains to be examined for producing acetic, propionic and butyric acids.

Bacterial strains proven to be able to persist in the rumen for a long time after an in vitro cultivation will be examined. In addition, bacterial strains isolated from the rumen liquor of a sheep fed on complete or any ration according to items A, B and C of Example 1 are examined, too.

Bacteria to be examined are cultivated on RGC+CG media (see below) in anaerobic conditions at 37° C. for 48 hours.

| Composition of RGC + CG media: | |
|---|---|
| salt solution I (see item A of Example 1) | 15% |
| salt solution II (see item A of Example 1) | 15% |
| trace element solution$^x$ | 0.3% |
| yeast extract (Oxoid) | 0.5% |
| filtered rumen liquor | 10.0% |
| $Na_2CO_3$ | 0.4% |
| cystein.HCl.$H_2O$ | 0.05% |
| sodium thiosulfate | 0.008% |
| cellulose (Bacto) | 0.3% |
| glucose | 2.0% |

| $^x$Composition of the trace element solution: | |
|---|---|
| $ZnCl_2$ | 40 mg |
| $CuCl_2.2H_2O$ | 10 mg |
| disodium tetraborate dekahydrate | 10 mg |
| ammonium molybdenate tetrahydrate | 10 mg |
| $FeCl_3.6H_2O$ | 200 mg |
| $MnCl_2.4H_2O$ | 10 mg |
| deionized water ad | 1000 ml |

Cultures are inoculated into media prepared in Erlenmeyer flasks. Two ml of culture each is inoculated into 50 ml of media, in two parallel flasks. Non-sterile cultures are inoculated, too.

The flasks are incubated under anaerobic conditions for 40 hours. The growth is stopped with 10% formic acid solution and the volatile fatty acid content of the cultures is examined.

The cultures are filtered through gaze layers and centrifuged at 4000 rev. per min. for 15 min., then filtered again and brought onto the separation column of a Carlo Erba GI-452 gas-liquid chromatograph, fitted with flame ionization detector, for determining the $C_2$-$C_5$ fatty acids.

Temperature of the column: 150° C.

Separation column: 2 m long, 4 mm wide (inner diameter) glass tube filled with 10% of ethylene glycol adipate and 2% of o-phosphoric acid on a silanated silica gel carrier (0.2 to 0.3 mm particle diameter).

Temperature of the injector: 190° C.

$N_2$ stream rate: 50 ml/min.

$H_2$ stream rate: 50 ml/min.

Stream rate of the air: 200 ml/min.

Paper movement; 160 cm/hour.

Duration of chromatography: 20 min.

Sample volume: 1 μl.

Triplicate measurements are made from each sample. The standard solution contains acetic acid, propionic acid, isobutyric acid, butyric acid, isovaleric acid and valeric acid.

More than 90 strains of bacteria were isolated from a sheep fed on a complete ration. Then the strains were labelled genetically and examined (the positive strains were examined several times). Representative results are shown in Table 8.

Explanation of the signs used in Table 8:
S: inoculated after sterilization
NS: culture containing living rumen flora was inoculated
a) trace amounts;
b) negative control: volatile fatty acid content of media prepared from rumen liquor, physiological buffer and feed used for the experiment (average of 12 measurements;
c) positive control: volatile fatty acid content of the incubated culture containing the initial rumen bacteria and otherwise prepared by the same process (average of 12 measurements);
d) as c) but 5 ppm monensin Na were added to the media (average of 6 determinations);
e) as c), but 10 ppm monensin Na was added to the media (average of 6 determinations).

long ruminal persistence will be orally administered for modifying the production of volatile fatty acids.

EXAMPLE 5

Bacterial preparation for oral administration to ruminants

Bacteria to be administered are cultured on RGCA+CG media (Example 4) under anaerobic conditions, by the described process. After cultivation, the cells are separated by filtration or centrifugation. Separated cells are suspended in physiological buffer (Example 4) and freeze dried. The lyophilized bacterial preparation is stored, suitably formulated and administered to ruminants orally.

Microorganisms may be cultivated in other conventionally used media as well, e.g. in media containing glucose and starch etc. as carbon source and inorganic salts as N-source.

The preparation can be easily administered by mixing it to feed or drinking water, alone or together with other biologically active agents, e.g. with antibiotics and vitamins.

In addition to the freeze-dried preparation other products can be prepared as well. The microorganisms

TABLE 8

| Bacterium strain | Remark | Acetic acid µg/ml | Propionic acid µg/ml | i-Butyric acid µg/ml | Butyric acid µg/ml | i-Valeric acid µg/ml | Valeric acid µg/ml | Acetic acid/ propionic acid |
|---|---|---|---|---|---|---|---|---|
| Hh-GYOKI-1-123Sz | S | 1.71 | 1.87 | a | 0.35 | a | — | 0.91 |
|  | NS | 2.00 | 2.60 | a | 0,50 | a | — | 0.77 |
| Hh-GYOKI-2-14Ab | S | 0.38 | 0.58 | a | 0.35 | a | — | 0.65 |
|  | NS | 1,95 | 1.36 | a | 0.52 | 0.12 | a | 1.43 |
| Hh-GYOKI-3-81Me | S | 2,21 | 0,67 | a | a | a | — | 3.29 |
|  | NS | 2,81 | 0,81 | a | a | a | — | 3,47 |
| b | Control | 1,51 | 0.74 | a | 0.39 | a | a | 2.04 |
| c |  | 1,68 | 0.91 | a | 0.51 | 0.11 | 0.09 | 1,84 |
| d |  | 1.69 | 1.08 | a | 0.41 | a | a | 1.67 |
| e |  | 1.61 | 0.91 | a | 0.37 | a | a | 1.77 |
| Hh-GYOKI-48a | S | 1,26 | 1.60 | a | 0,32 | a | — | 0,79 |
|  | NS | 1,21 | 2,38 | a | 0,34 | 0.48 | a | 0.51 |
| Hh-GYOKI-50a | S | 1.44 | 1.56 | a | 0,34 | a | — | 0.92 |
|  | NS | 1,73 | 2,01 | a | 0.35 | 0.15 | — | 0.86 |
| Hh-GYOKI-51a | S | 2,37 | 0,47 | a | 0.36 | a | — | 5.04 |
|  | NS | 2,02 | 0,70 | a | 0.35 | 0.15 | — | 2.89 |
| Hh-GYOKI-55a | S | 2.10 | 0.51 | a | 0,34 | a | — | 4.12 |
|  | NS | 2,18 | 0,78 | a | 0.37 | 0,14 | — | 2.79 |
| Hh-GYOKI-113 | S | 1,39 | 0,67 | a | 0,34 | — | — | 2.07 |
|  | NS | 1,77 | 0,60 | a | 0.27 | — | — | 2,95 |
| Hh-GYOKI-122 | S | 1,31 | 0,87 | a | 0.31 | — | — | 1,50 |
|  | NS | 2.02 | 0,91 | a | 0,31 | — | — | 2.22 |
| Hh-GYOKI-109b | S | 2,49 | 0,45 | a | 0.29 | — | — | 5,53 |
|  | NS | 2,92 | 0,36 | a | 0.30 | — | — | 8.11 |
| Hh-GYOKI-126 | S | 0,56 | 0,60 | a | 0.52 | a | a | 0,93 |
|  | NS | 0,83 | 1,14 | a | 1,55 | 0,11 | 0.70 | 0.73 |

The data of Table 8 indicate that the ratios of volatile fatty acids produced by the fermentative function of the rumen flora can be modulated in a wide range by the administration of microbial cultures prepared according to the invention. E.g. production of propionic acid can be significantly stimulated with a culture prepared from strain Hh-GYOKI-48a, while strain Hh-GYOKI-109b stimulates production of acetic acid. Stimulation of production of individual fatty acids was observed both on media lacking (S) or containing (NS) living rumen microbes. In our experimental system monensin Na decreased the ratio of acetic acid to propionic acid by 0.1 or 0.2 (d, e).

Microorganisms chosen by the above-mentioned process are labelled genetically, administered to ruminants and examined for ruminal growth and persistence by repeating the process described in item B) of Example 1. Strains with an advantageous fermentative pattern and may also be administered after mixing the filtered or centrifuged bacterial mass with suitable carrier or diluting substances, e.g. $CaCO_3$, concentrates, premixes or other feedstuffs.

The bacterial strain(s) are chosen from the microorganisms, prepared by the process of the invention and advantageously modifying the rumen flora, and their quantity to be fed is determined depending on the ration and the use of the animal. If a decrease of the acetic acid to propionic acid ratio is required, we may use e.g. a culture prepared from strain Hh-GYOKI-48a, but for an increase of the ratio the administration of strain Hh-GYOKI-3-81Me is recommended.

Determination of the required microbial cell number may not mean any difficulty for those skilled in the art. It is recommended to administer the cells in a quantity to make $5 \times 10^2$ to $5 \times 10^7$ cultivated microorganisms per ml of rumen liquor.

EXAMPLE 6

Administration of strains Hh-GYOKI-48a and Hh-GYOKI-1-123Sz to sheep

Hh-GYOKI-48a strain is cultivated on RGCA"CG media (Example 4) in two 5-liter fermentors (useful volume) at 37° C., under anaerobic conditions. Fermentation is commenced by inoculation with a 10 ml culture of similar composition. After 48 hours of cultivation the cells are separated by centrifugation (5000 r.p.m.) and the wet sediment weighing 58 g is mixed carefully with 4 kg of corn meal. The mixture is divided to eight equal parts and orally administered to eight sheep previously starved for 24 hours. Strain Hh-GYOKI-1-123Sz may be used similarly, with a bacterial harvest of 53 g.

In a growing-fattening experiment 23 sheep were ad libitum fed on poor grass hay and the animals were weighted every week for 5 weeks. The experimental groups consisting of eight sheep were fed by one of the bacterial preparations each for a single feeding and seven sheep served as control. 600 to 900 g of hay were consumed per day and animal, plus mineral and vitamin premix mixed with corn meal (100 g.). The results are shown in Table 9.

TABLE 9

Weight gain in sheep fed ad libitum on grass hay

| Serial number | Initial weight | 1st | 2nd | 3rd | 4th | 5th |
|---|---|---|---|---|---|---|
|  |  |  |  | week |  |  |
| Control |  |  |  |  |  |  |
| 1 | 29.0 | 29.5 | 30.0 | 29.5 | 29.5 | 29.5 |
| 2 | 27.0 | 27.5 | 28.5 | 27.0 | 26.5 | 28.0 |
| 3 | 28.5 | 27.0 | 27.0 | 27.5 | 26.5 | 26.5 |
| 4 | 30.0 | 30.5 | 30.0 | 30.5 | 30.0 | 29.0 |
| 5 | 29.5 | 30.0 | 29.0 | 30.5 | 29.5 | 30.0 |
| 6 | 25.0 | 25.5 | 26.5 | 26.0 | 26.0 | 27.5 |
| 7 | 27.0 | 27.0 | 27.5 | 28.0 | 28.0 | 28.0 |
| Treated with strain Hh-GYOKI-1-123Sz |  |  |  |  |  |  |
| 8 | 29.5 | 32.0 | 32.5 | 33.0 | 33.5 | 34.0 |
| 9 | 25.5 | 26.5 | 27.0 | 28.5 | 29.5 | 29.0 |
| 10 | 25.0 | 25.5 | 25.0 | 28.0 | 29.0 | 28.5 |
| 11 | 25.5 | 24.5 | 25.5 | 27.5 | 27.0 | 28.0 |
| 12 | 29.0 | 28.0 | 29.0 | 28.5 | 29.0 | 30.0 |
| 13 | 29.5 | 30.0 | 30.5 | 29.5 | 29.5 | 30.5 |
| 14 | 29.5 | 28.5 | 29.5 | 30.0 | 30.5 | 31.0 |
| 15 | 28.5 | 29.0 | 30.5 | 30.0 | 30.5 | 32.0 |
| Treated with strain Hh-GYOKI-48a |  |  |  |  |  |  |
| 16 | 29.5 | 30.0 | 30.5 | 31.0 | 32.0 | 33.5 |
| 17 | 26.5 | 25.0 | 26.5 | 27.0 | 29.0 | 30.0 |
| 18 | 27.0 | 27.5 | 28.5 | 29.5 | 30.5 | 31.0 |
| 19 | 26.0 | 26.0 | 27.0 | 28.0 | 29.0 | 30.5 |
| 20 | 29.5 | 30.5 | 31.0 | 31.5 | 32.5 | 33.0 |
| 21 | 28.0 | 28.0 | 28.0 | 29.0 | 29.0 | 30.0 |
| 22 | 29.0 | 30.5 | 33.2 | 30.0 | 32.8 | 33.5 |
| 23 | 27.0 | 26.0 | 27.5 | 29.0 | 31.0 | 32.0 |

The average daily weight gain is calculated from the date of Table 9 and are shown in Table 10.

TABLE 10

Average weight and daily weight gain of experimental and control sheep

|  | Initial weight | 1st | 2nd | 3rd | 4th | 5th |
|---|---|---|---|---|---|---|
|  |  |  |  | week |  |  |
| Control |  |  |  |  |  |  |
| Mean body weight (kg) | 28.00 | 28.14 | 28.36 | 28.43 | 28.00 | 28.36 |
| Mean daily weight gain (g) |  | +20 | +31 | +10 | −61 | +51 |
| Treated with strain Hh-GYOKI-1-123Sz |  |  |  |  |  |  |
| Mean body weight (kg) | 27.75 | 28.00 | 28.69 | 29.31 | 29.81 | 30.37 |

TABLE 10-continued

Average weight and daily weight gain of experimental and control sheep

|  | Initial weight | 1st | 2nd | 3rd | 4th | 5th |
|---|---|---|---|---|---|---|
|  |  |  |  | week |  |  |
| Mean daily weight gain (g) |  | +31 | +86 | +77 | +62 | +70 |
| Treated with strain Hh-GYOKI-48a |  |  |  |  |  |  |
| Mean body weight (kg) | 27.81 | 27.94 | 29.02 | 29.37 | 30.73 | 31.69 |
| Mean daily weight gain (g) |  | +16 | +135 | +44 | +170 | +120 |

Sheep treated with strains Hh-GYOKI-1-123Sz and Hh-GYOKI-48a and the control group gained on the poor ration in averge 2620, 3875 and 360 g, respectively, during the 35-day experimental period.

Initial body weights did not differ significantly between groups, but significant differences were found in the final body weights (Table 11) and in the daily gains (Table 12).

TABLE 11

Statistical evaluation of final body weights

|  | Control | Hh-GYOKI-1-123Sz | Hh-GYOKI-48a |
|---|---|---|---|
| Mean (kg) | 28.357 | 30.375 | 31.6875 |
| Corrected quadrate of standard deviation | 1.476 | 3.910 | 2.281 |
| p (%) |  | <5.0 | <0.1 |

TABLE 12

Statistical evaluation of body weight gains (5 weeks)

|  | Control | Hh-GYOKI-1-123Sz | Hh-GYOKI-48a |
|---|---|---|---|
| Number of animals | 7 | 8 | 8 |
| Total weight gain of the group (kg) | 2.5 | 21.0 | 31.0 |
| Maximum gain (kg) | 2.5 | 4.5 | 5.0 |
| Minimum gain (kg) | −2.0 | 1.0 | 2.0 |
| Mean gain per sheep (kg) | 0.3571 | 2.6250 | 3.8750 |
| Corrected quadrate of standard deviation | 2.143 | 1.768 | 0.839 |
| Standard deviation | ±1.355 | ±1.244 | ±0.857 |

The data indicate that preparations made according to the invention may markedly stimulate weight gain in sheep.

EXAMPLE 9

Persistance of genetically labelled bacteria in the bovine rumen

The process described under item C) of Example 1 is repeated with the difference that the strain Hh-GYOKI-1-123Sz resistant to 10,000 μg/ml kanamycin is cultivated in 4 liter of RGCFa media. After reaching the stationary phase (38th hour) the culture is harvested by centrifugation (5000 r.p.m.) and the cells thoroughly mixed with 500 g of corn meal are fed to a cow. Weekly samples are taken through a fistula, and ruminal persistence of the strain administered is determined according to item C) of Example 1.

Results indicate that strain Hh-GYOKI-1-123Sz grows in the bovine rumen and it can persist there for at least 40 days.

We claim:

1. A composition for improving the efficiency of ruminant feed utilization comprising, as the active component, an acetic acid or propionic acid producing microorganism capable of adjusting the weight ratio of acetic acid to propionic acid to a value of 1.5 to 4.0:1 and of growing in the rumen and persisting there at least 60 days wherein the microorganism is a member selected from the group consisting of Propionibacterium genus deposit No. NCAIM B(P) 000287, Viellonella genus deposit No. NCAIM B(P) 000288 and Bifidobacteria genus deposit No. NCAIM B(P) 000289, the deposited numbers being of the National Collection of Agricultural and Industrial Microorganisms, Budapest, Hungary and a carrier therefor.

2. The composition of claim 1 which additionally comprises a a diluent, preservative, nutrient or mixtures thereof.

3. The composition of claim 1 which comprises at most 95% by weight of active ingredient.

4. The composition of claim 1 which comprises a microorganism capable of adjusting the acetic acid to propionic acid ratio to 2.0-3.5:1.

5. The composition of claim 1 in the form of a microorganism past, lyophilizate or suspension.

6. A process for the preparation of a composition for improving the efficiency of ruminent feed utilization, said composition containing an acetic acid or propionic acid producing microorganism capable of adjusting the weight ratio of acetic acid to propionic acid to a value of 1.5 to 4.0:1 and of growing in the rumen and persisting there at least 60 days, wherein the microorganism is a member selected from the group consisting of Propionibacterium genus deposit No. NCAIM B(P) 000287, Viellonella genus deposit No. NCAIM B(P) 000288 and Bifidobacteria genus deposit No. NCAIM B(P) 000289, the deposit numbers being of the National Collection of Agricultural and Industrial Microorganisms, Budapest, Hungary, comprising the following steps:

(a) taking samples of microorganisms from the rumen of animals fed on a given feedstuff,
    (b) testing the microorganisms taken from the rumen for the capacity to product volatile fatty acids in vitro,
    (c) selecting microorganisms having the capacity to produce acetic acid or propionic acid and which are capable of adjusting the weight ratio of acetic acid to propionic acid to a value of 1.5 to 4.0:1,
    (d) cultivating the microorganisms selected in step (c) in media containing, as the carbon or nitrogen source, the same feedstuff as was used to feed the animals from which the samples were taken in step (a),
    (e) genetically labelling the microbial culture of step (d) to produce genetically marked strains,
    (f) cultivating the genetically marked strains in the same media used in step (d) to produce genetically marked cultures of microorganisms.
    (g) introducing the genetically marked cultures into the rumen of animals fed on the same feedstuff contained in the media used to cultivate the microorganisms in step (d),
    (h) taking samples of microorganisms from the rumen of the animals in which the genetically marked cultures were introduced in step (g) at least 60 after the introduction thereof,
    (i) selecting the genetically marked strains from the sample taken in step (h),
    (j) cultivating the genetically marked strains selected in step (i) on the same feedstuff used in step (d) to produce genetically marked cultures of microorganisms, identified by the above-stated deposited numbers, which produce acetic acid or propionic acid and which are capable of adjusting the weight ratio of acetic acid to propionic acid to a value of 1.5 to 4.0:1 and of growing in the rumen and persisting thereat least 60 days, and
    (k) mixing the microbial cultures of step (j) with a carrier, diluent, preservatives or nutrients.

7. The process of claim 6 in which antibiotic resistance is used as genetic marker.

8. The process of claim 6 in which microorganisms are isolated from the rumen of animals fed on a cellulose-containing feedstuff, a starch-containing feedstuff or a monosaccharide-containing feedstuff, disaccharide-containing feedstuff or mixture thereof and the genetically marked strains are introduced into the rumen of animals fed on the same feedstuff.

9. A process for improving the efficiency of ruminant feed utilization comprising orally administering to a ruminant animal an effective amount of an acetic acid or propionic acid producing microorganism capable of adjusting the acetic acid to propionic acid ratio in the rumen to a value of 1.5-4.0:01 and of growing in the rumen and persisting there at least 60 days wherein the microorganism is a member selected from the group consisting of Propionibacterium genus deposit No. NCAIM B(P) 000287, Viellonella genus deposit No. NCAIM B(P) 000288 and Bifidobacteria genus deposit No. NCAIM B(P) 000289, the deposit numbers being of the National Collection of Agricultural and Industrial Microorganisms, Budapest, Hungary.

* * * * *